US011755310B2

(12) United States Patent
Vrooman et al.

(10) Patent No.: US 11,755,310 B2
(45) Date of Patent: *Sep. 12, 2023

(54) PRIORITIZED RANKING FOR MEMORY DEVICE PREPARATION

(71) Applicant: Oracle International Corporation, Redwood Shores, CA (US)

(72) Inventors: Tyler Vrooman, Seattle, WA (US); Graham Schwinn, Woodinville, WA (US); Greg Edvenson, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,229

(22) Filed: Jul. 27, 2022

(65) Prior Publication Data

US 2022/0365770 A1 Nov. 17, 2022

Related U.S. Application Data

(63) Continuation of application No. 17/074,356, filed on Oct. 19, 2020, now Pat. No. 11,436,000.

(51) Int. Cl.
*G06F 8/65* (2018.01)
*G06F 3/06* (2006.01)

(52) U.S. Cl.
CPC ............ *G06F 8/65* (2013.01); *G06F 3/0604* (2013.01); *G06F 3/0652* (2013.01); *G06F 3/0676* (2013.01)

(58) Field of Classification Search
USPC ...................................................... 717/168
See application file for complete search history.

(56) References Cited

U.S. PATENT DOCUMENTS 8,566,826 B2 10/2013 Garmark
9,753,782 B2 9/2017 Fang
(Continued)

OTHER PUBLICATIONS

Bo Zhang et al.; "CloudGC: Recycling Idle Virtual Machines in the Cloud"; 5th IEEE International Conference on Cloud Engineering (IC2E); 2017 (Year: 2017).

*Primary Examiner* — Qing Chen
*Assistant Examiner* — Clint Thatcher
(74) *Attorney, Agent, or Firm* — Trellis IP Law Group, PC

(57) ABSTRACT

Example embodiments facilitate prioritizing the recycling of computing resources, e.g., server-side computing systems and accompanying resources (e.g., non-volatile memory, accompanying firmware, data, etc.) leased by customers in a cloud-based computing environment, whereby computing resources (e.g., non-volatile memory) to be forensically analyzed/inspected, sanitized, and/or updated are prioritized for recycling based on estimates of when the computing resources are most likely to require recycling, e.g., via background sanitizing and updating. Computing resources that are likely to be recycled first are given priority over computing resources that are more likely to be recycled later. By prioritizing the recycling of computing resources according to embodiments discussed herein, other cloud-based computing resources that are used to implement computing resource recycling can be efficiently allocated and preserved.

20 Claims, 7 Drawing Sheets

(56) References Cited

U.S. PATENT DOCUMENTS

| | | |
|---|---|---|
| 10,496,306 B1 | 12/2019 | Srivastava |
| 10,812,521 B1 | 10/2020 | Sharifi Mehr |
| 11,113,117 B2 | 9/2021 | Jha |
| 2014/0196049 A1 | 7/2014 | Bobroff |
| 2017/0214588 A1 | 7/2017 | Murthy |
| 2018/0365064 A1* | 12/2018 | Gakhar ................ G06F 9/5083 |
| 2019/0236506 A1* | 8/2019 | Abuelsaad ............ G06F 9/5072 |
| 2019/0268435 A1* | 8/2019 | Konoor ............... H04L 67/5681 |
| 2019/0286354 A1 | 9/2019 | Brundidge |
| 2019/0332369 A1 | 10/2019 | Gupta |
| 2019/0370078 A1* | 12/2019 | Jha .................... G06F 18/23213 |
| 2020/0285503 A1 | 9/2020 | Dou |
| 2020/0379900 A1 | 12/2020 | Vrooman |
| 2021/0064431 A1 | 3/2021 | Smith |
| 2021/0224109 A1 | 7/2021 | Wong |
| 2022/0121390 A1 | 4/2022 | Vrooman |

\* cited by examiner

PRIORITIZED RANKING FOR MEMORY DEVICE PREPARATION

CROSS REFERENCES TO RELATED APPLICATIONS

This application is a. continuation of the following application, U.S. patent application Ser. No. 171074,356, entitled PRIORITIZED NON-ACTIVE MEMORY DEVICE UPDATE, filed on Oct. 19, 2020 (ORACP0262/ORA200515-US-NP), which is hereby incorporated h reference as if set forth in full in this application for all purposes.

This application is related to the following applications. U.S. patent application Ser. No, 17/074,379, entitled ACCELERATED NON-VOLATILE. MEMORY DEVICE INSPECTION AND FORENSICS, filed on Oct. 19, 2020 (ORACP0263/ORACP00516-US-NP) and U.S. patent application Ser. No. 16/884,002, entitled CONFIGURABLE MEMORY DEVICE CONNECTED TO A MICROPROCESSOR, filed on May 26, 2020 (OR..ACP0250/ORA190597-US-NP) which claims priority to U.S. Provisional Application Ser. No. 62/853,667, entitled CONFIGURABLE MEMORY DEVICE CONNECTED TO A MICROPROCESSOR, filed n May 28, 2019, which are hereby incorporated by reference as if set forth in full in this application for all purposes.

BACKGROUND

The present application relates to computing, and more specifically to software, systems, and methods for enhancing efficiency with which computing resources are recycled in a computing environment while minimizing downtime of the computing resources.

Systems and methods for selectively recycling computing resources, e.g., computer systems and accompanying memory, data, software, and so on, are employed in various demanding applications, including cloud-based applications involving leasing of server-side computer systems (e.g., servers) to external customers, where accompanying server-side computer systems must be recycled before being turned over to or leased to new customers when prior customers relinquish them. Such applications often demand efficient mechanisms for facilitating recycling computing resources, while minimizing computing resource downtime and minimizing cloud-based resources required to perform the recycling operations.

In an example cloud-based computing environment, computer systems are recycled; then turned over to a subsequent user. The recycling process may involve digitally sanitizing and updating the computer system, such as by erasing prior data (e.g., data from a prior customer), updating older firmware running on non-volatile memory devices of the computer, and so on.

Conventionally, when a user relinquishes use of their leased computer system, the entire computer system is taken offline while the system is recycled, e.g., by performing a wipe of the non-volatile memory and replacement with new firmware and accompanying data. However, this can result in substantial downtime for the computer system, whereby the host organization loses revenue. Furthermore, use of conventional wiping and reinstallation of firmware and data can be particularly time consuming, thereby further extending computer system downtime.

Alternative approaches to the recycling of computing resources may exhibit similar inefficiencies, such that excessive cloud-based resources may be required for the recycling operations. Furthermore, existing approaches generally lack functionality for optimally determining when a recycling event should take place, other than, merely after a particular event, e.g., the release of the computing resource by a given customer.

SUMMARY

Various embodiments discussed herein employ a recycling prioritization determination system in communication with a computer background updating system to facilitate selectively and efficiently allocating cloud-based computing resources to perform background updating on computer systems and accompanying memory devices according to a priority ranking. Computer systems and accompanying memory devices (e.g., non-volatile memories) can be prioritized for recycling, such that cloud-based computing resources used for recycling computer systems can be efficiently focused on updating the computer systems and accompanying non-volatile memories in accordance with the priority rankings. The priority rankings may be set, such that computer systems that are most likely to require recycling next are given priority for recycling operations, e.g., background updating.

An example method facilitates efficient use of network-accessible computing resources used to recycle or update other computing resources in a cloud-based computing environment. The example method includes determining a set of computers that are currently in use by one or more users of the cloud-based computing environment; obtaining one or more metrics associated with each computer of the set of computers; using the one or more metrics to determine one or more estimates as to when each computer of the set of computers is likely to be vacated by a current user of each computer of the set of computers; and employing the one or more estimates for each computer of the set of computers to determine when to launch a background updating process to recycle each computer.

In a more specific embodiment, the step of employing further includes using the one or more estimates to prioritize: recycling each computer, such that computers of the set of computers that are estimated to be recycled sooner are prioritized for the background updating process.

The step of recycling may further include employing the background updating process to update firmware on one or more memory devices of each computer being recycled. The one or more memory devices may include one or more alternate memory devices that are configured (by the background updating process) to be switched to replace the one more memory devices of each computer that is to be vacated by the current user.

The recycling may further include employing the background updating process to update firmware and/or software on one or more memory devices of each computer being recycled; and employing the background updating process to conduct forensic analysis on one or more memory devices of each computer being recycled. The one or memory devices may include one or more non-volatile memory devices, e.g., accommodating or representing Network Interface Controllers (NICs), Basic Input-Output Systems (BIOS), Field Programmable Gate Arrays (FPGAs), etc.

The one or more metrics may include one or more of the following: a first metric indicating how long each computer has been in use, whereby computers in use longer indicate a higher likelihood of being vacated sooner by the user; a second metric indicating a historical duration for which the user has retained use of one or more computers, whereby computers used by users that frequently vacate computers indicate a higher likelihood of being vacated sooner by the user; a third metric indicating a turnover rate for each computer in accordance with an identification number of each computer, whereby computers identified as being associated with high turnover rates indicate a higher likelihood of being vacated sooner by the user; a fourth metric measuring a temperature associated with each computer, whereby computers associated with lower temperatures indicate a higher likelihood of being vacated sooner; and a fifth metric representing an output value of a machine learning model that accounts for one or more of the first metric, second metric, third metric, and fourth metric, of a machine learning model.

Accordingly, various embodiments discussed herein can facilitate prioritizing background updating of one or more non-volatile memory devices of computer systems. This facilitates conservation of network bandwidth used to implement the background updating and associated recycling of the non-volatile memories and associated computing resources, e.g., firmware, data, and so on.

Note that conventionally, updates to the non-volatile memory devices may have been simultaneously pushed out to all computer systems in use. However, this was inefficient and unnecessarily compromised network bandwidth. Embodiments discussed herein overcome such problems with prior approaches to facilitating implementation of computer resource (e.g., including non-volatile memory and accompanying firmware, data, etc.) recycling and associated background recycling.

A further understanding of the nature and the advantages of particular embodiments disclosed herein may be realized by reference of the remaining portions of the specification and the attached drawings.

DETAILED DESCRIPTION OF EMBODIMENTS

Figure 1:
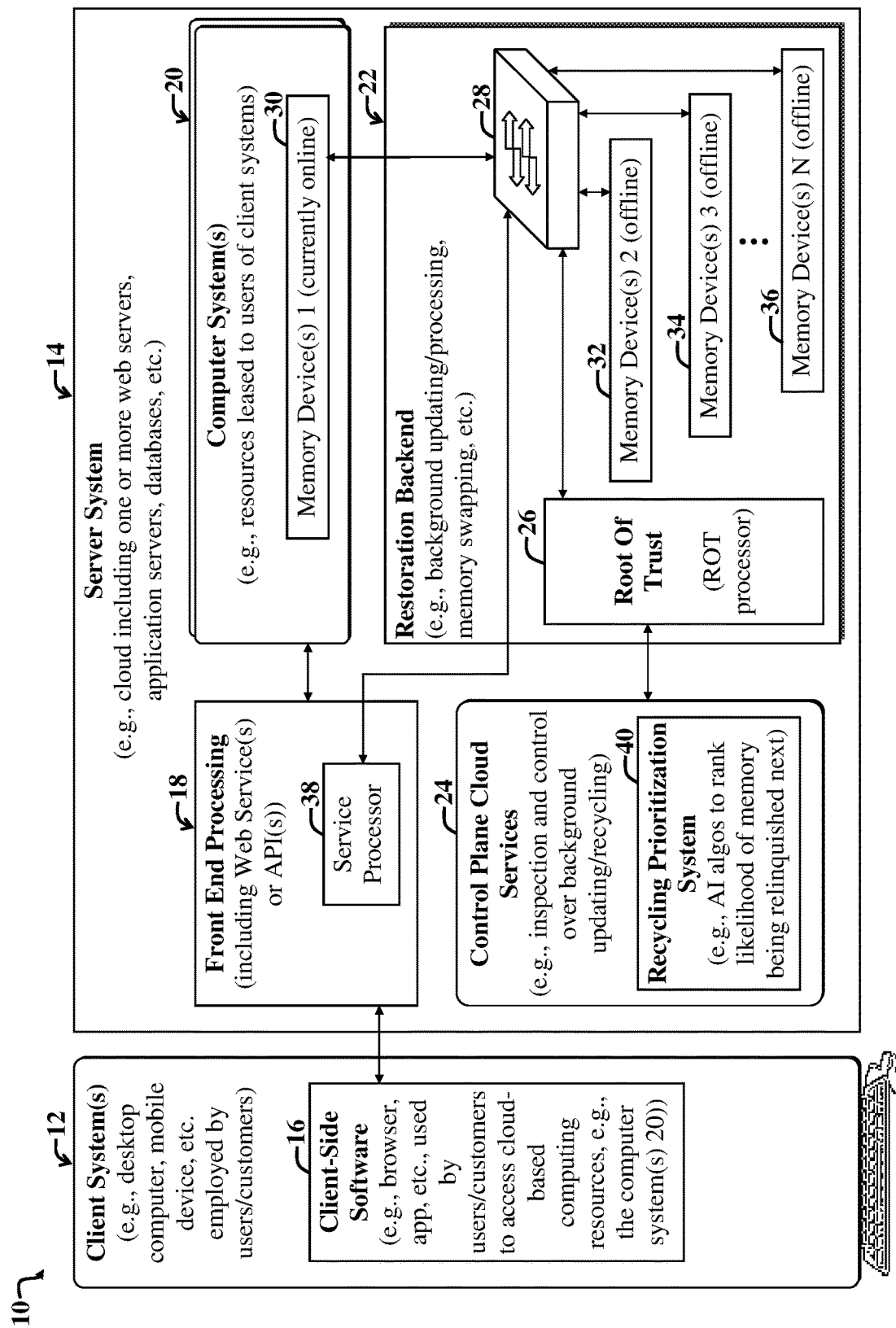
FIG. 1 illustrates a first example system and accompanying computing environment employing a restoration backend to facilitate selectively implementing background updating of computing resources in accordance with prioritization values determined by a recycling prioritization system, as may be implemented via one or more cloud services and or Application Programming Interfaces, and/or code libraries.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, data, and so on.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

A data center may be any collection of one or more buildings or facilities for accommodating plural computer systems (also simply called computers herein), e.g., servers, and other cloud-based computing resources.

Cloud-based computing resources may be any computing resources accommodated by a data center or other collection of one or more intercommunicating servers.

A cloud service may be any mechanism (e.g., one or more web services, Application Programming Interfaces (APIs), etc.) for enabling a user and/or other software application to employ data and/or functionality provided via a cloud. A cloud may be any collection of one or more servers. For example, certain clouds are implemented via one or more data centers with servers that may provide data, data storage, and other functionality accessible to client devices.

Certain data centers may provide centralized locations for concentrating computing and networking equipment for users to access, consume, and store large amounts of data. Often in collections of computing systems, e.g. cloud computing systems, common resources such as processors and memory are configured for different users to utilize in turn. Such computing collections utilize rewritable memory, e.g. flash memory, that can be erased once one user is done with it and rewritten for a next user. For example, a cloud service provider must ensure that when a new user begins accessing a cloud resource, the resource is configured properly for a subsequent user and any information from a prior user is unavailable.

For clarity, certain well-known components, such as the Internet, hard drives, processors, power supplies, routers, Internet Service Providers (ISPs), Input/Output (I/O) workflow orchestrators, process schedulers, identity management clouds, process clouds, certificate authorities, business process management systems, database management systems, middleware, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing a restoration backend 22 to facilitate selectively implementing background updating of computing resources in accordance with prioritization values determined by a recycling prioritization system 40, as may be implemented via one or more cloud services and/or Application Programming Interfaces, and/or code libraries, such as Root of Trust (ROT) libraries, which may run among or be included within or among control plane cloud services 24 (also called the control plane cloud services module 24 herein).

The example system 10 includes one or more client systems 12 in communication with a server system 14, e.g., via the Internet or other network. The server system 14 may be implemented via a data center and may represent a cloud.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, while a switch 28 (as discussed more fully below) is shown included in a restoration backend 22, the switch 28 may be considered outside of the restoration backend 22, without departing from the scope of the present teachings. Similarly, a service processor 38 of a front-end processing module 18 may be considered part of the one or more server-side computer systems 20, as opposed to part of the front-end processing module 18, without departing from the scope of the present teachings.

Furthermore, an alternative grouping and arrangement of modules of a system, which may be readily adapted for use with the present teachings (and associated embodiments discussed herein) by those skilled in the art, is discussed more fully in the above-identified and incorporated US Patent Application, entitled CONFIGURABLE MEMORY DEVICE CONNECTED TO A MICROPROCESSOR.

In the present example embodiment, the client system 12 includes client-side software 16 for facilitating accessing data and functionality provided by the server system 14. The example server system 14 includes a front-end processing module 18, which may be implemented via one or more web services and/or Application Programming Interfaces (APIs) and associated processors, including a service processor 38.

For the purposes of the present discussion, software functionality may be any function, capability, or feature, e.g., stored or arranged data, that is provided via computer code, i.e., software. Software functionality may include actions, such as retrieving data pertaining to a computing object (e.g., business object); performing an enterprise-related task, calculating analytics, launching certain dialog boxes, performing searches, implementing forensics analysis algorithms on memory devices, and so on, as discussed more fully below.

The front-end processing module 18 communicates with one or more first computer systems 20, resources of which are selectively leased to users, e.g., customers of a proprietor of the server system 14. Generally, such a first computer system 20 includes one or more first memory devices 30 used to facilitate operations of the first computer system 20.

Note that the term "memory device," may be used interchangeably with the term "memory," herein.

Requests to perform operations (that a user of the client system 12 directs the first computer system 20 to perform via issuance of one or more request messages from the client system 12 to the computer system 20) are handled by the service processor 38 of the front-end processing, which facilitates interfacing the client system 12 with server-side computing resources, including the first memory device 30 (and accompanying firmware, data, etc.) of the first computer 20, in addition to other computing resources (e.g., processing, operating system software, application software, and so on) provided by the computer system 20.

When the service processor 38 is handling messaging from the client system 12, which may then thereby affect use of the first memory device 30, then the first memory device 30 is said to be online or active, i.e., it's being used or is available for use by the client system 12 via the front-end processing module 18. Similarly, when the first memory device 30 is electronically isolated (e.g., via a switch 28, as discussed more fully below) from the client system 12 and front-end processing module 18, the first memory device 30 is said to be offline or non-active. Note that the service processor 38 may include functionality similar to a Baseboard Management Controller (BMC) for monitoring server (computer system) hardware and communicating with various peripherals, e.g., Field-Programmable Gate Arrays (FPGAs), Basic Input/Output Systems (BIOS s), etc.

In the present example embodiment, the restoration backend 22 includes various modules 26, 28, 32-36 and associated functionality involved in implementing background updating and associated processing of one or more offline memory devices 32-36. The restoration backend 22 communicates with the service processor 38 of the front-end processing 18 and with the first memory device 30 of the first computer system 20.

The various modules 26, 28, 32-36 of the restoration backend 22 include a Root of Trust Processor (ROT) 26 (also called ROT processor herein). The ROT 26 implements functionality for securely interfacing one or more cloud services of the control plane cloud services 24 with the one or more of the memory devices 32-36 of the restoration back end 22, via the switch 28. The ROT 26 may issue one or more control signals to the switch 28, e.g., to selectively control switching operation of the switch 28, as discussed more fully below.

The switch 28 selectively couples (e.g., in response to one or more control signals issued by the ROT processor 26) the service processor 38 with one or more of the memory devices 30-36. In the present embodiment, the service processor 38 is electrically coupled to the first memory device 30 via the switch 28.

For illustrative purposes, the first memory device 30 is shown included in the first computer system 20. However, the first memory device 30 may or may not be included within the first computer system 20. The switch 28 includes functionality for selectively electrically disconnecting communications between the service processor 38 and the first memory device 30, and reconnecting it to one or more other memories, e.g., one of the currently offline memory devices 32-34.

This switching and reconnecting is called swapping herein. For instance, if the ROT 26 issues a control signal to the switch 28 to disconnect the service processor 38 from the first memory device 30; place the first memory device 30; then connect to the third memory device 34, then the third memory device 34 may be considered part of the first computer system 20, to the extent that the third memory device 34 can then be used by the first computer system 20, whereas the prior first memory 30, gets electronically moved into the restoration backend 22 via the switch 28.

Note that the ROT processor 26 also communicates with one or more cloud services (e.g., web services, Application Programming Interfaces (APIs), etc.) of the control plane cloud services 24. In the present example embodiment the control plane cloud services 24 includes modules for implementing functionality (effectuated through the ROT processor 26) to implement forensics analysis and data writing to one or more of the offline memories 32-36 that may be undergoing backend processing, e.g., preparation for being usable to replace the first memory device 30 when another user is assigned the first computer system 20.

By selectively using offline backend processing to prepare the memory devices 32-36 for subsequent use in association with the first computer system 20, while the first memory device 30 is offline, this can obviate any downtime for the first computer system 20.

For instance, when the first computer system 20 is relinquished by a first user of the client system(s) 12, after using the first memory device 30, then the ROT processor 26 can detect this event, e.g., via signaling from one or more cloud services of the control plane cloud services 24. Upon detection of such a relinquishing event, the ROT processor 26 may then use the switch 28 to electronically swap out the first memory device 30. For instance, the first memory device 30 may be electronically swapped out and replaced with the third memory device 34 that has been sanitized, updated, and otherwise processed in preparation for use by a subsequent user of the first computer system 20.

This swapping time, happening upon turnover of the first computer system 20 from a first user to a second user (or in preparation for turnover to a second user) may be close to zero, such that downtime of the computer system 20 is virtually eliminated.

Note that embodiments discussed herein include additional beneficial technology; not just the offline background processing for the purposes of implementing recycling operations.

For instance, as discussed more fully below, the control plane cloud services module 24 includes one or more cloud services (e.g., web services) or other modules for implementing the recycling prioritization system 40. In the present example embodiment, the recycling prioritization system 40 ranks all computer systems 20 in a given fleet of available computer systems based on estimates as to how soon they will be relinquished. When a computer system (e.g., the computer system 20) is relinquished, it then is to be background processed, e.g., the existing memory device 30 is to be electronically disconnected from the computer system 20 (e.g., via the switch 28 responsive to a control signal from the ROT processor 26), and a new sanitized, i.e., background processed (via a recycling operation) memory is to be electronically switched in place, i.e., placed online for use by the computer system 20 and a subsequent user.

Computing resources of the server system 14 that are available for background processing are then applied to a subset of the entire fleet of computer systems 20. That subset is taken from the top most prioritization values, i.e., values corresponding to estimated likelihoods that a given computer system and accompanying memory device(s) will soon require background processing and accompanying recycling operations in preparation for future use.

Generally, the more computing system resources of the server system 14 that are available for use in background processing operations, the larger the subset may be, depending upon the demands of a given computing environment.

In summary, note that different users occupy computer systems for differing durations. When a new software update or configuration becomes available for deployment, various embodiments discussed herein give priority (based on estimates or prioritization values determined by the recycling prioritization system 40) to background update and sanitize (e.g., perform recycling operations on) computer systems that are most likely to next be recycled.

Note that exact methods for determining or estimating how likely a computer system will need to be recycled next, may be implementation specific and may vary, depending upon specifics of a given implementation.

Nevertheless, embodiments may employ one or more of several methods to facilitate estimating the likelihood that a computer system will be relinquished nest, and thereby require recycling. These methods include, but are not limited to accounting for the following factors:

Machines in use for the shortest period of time through ones in use for the longest time, where such data represents a metric, whereby machines, i.e., computer systems, having been in use longer, as indicated by the metric, may be more likely to be recycled next than machines that have just been allocated to new users (or vice versa).

Machines used by customers who have a history of keeping their machines the shortest through customers that keep their machines the longest, whereby such customer history data represents a metric, whereby machines occupied by users associated with high turnover rates, as indicated by the metric, may be more likely to require recycling next.

Machine Stock Keeping Unit number and/or type (e.g., E3-2c compute, E3-2c block storage, etc.) sorted by SKUs historically leased for the shortest intervals to ones leased for the longest intervals, whereby turnover data associated with the machine SKUs (or other identification numbers) represents a metric that can indicate a likelihood that a given machine will require recycling next.

Measuring host Central Processing Unit (CPU) temperature to infer a load metric, whereby lower CPU temperatures, as indicated by the metric may indicate a less busy machine that is more likely to be recycled next.

Metrics output by machine learning models (e.g., Artificial Intelligence (AI) modules) using any one or a combination of above methods to determine patterns in time of use, historical customer behavior, SKU type and system load to predict next most likely recycle event, and so on.

Note that recycling prioritization of computer systems (and accompanying memory devices) in accordance with embodiments discussed herein can be particularly useful in computing environments (e.g., cloud-based environments) with limited computing resources, e.g., limited bandwidth or other system resources.

The background update mechanisms and methods discussed herein can also be important, due in part to the importance of implementing computer software, firmware, and/or other related configuration updates. Such updates may take substantial time, and when a recycling event is blocked (e.g., to limited computing environment resources), this can translate into lost revenue for a proprietor of the server system 14 and associated computing environment. Furthermore, blocking of updates can result in excessive downtime of computer systems that cannot be leased when down or offline. Accordingly, elasticity of the fleet of computer systems 20 can be problematically affected.

Figure 2:
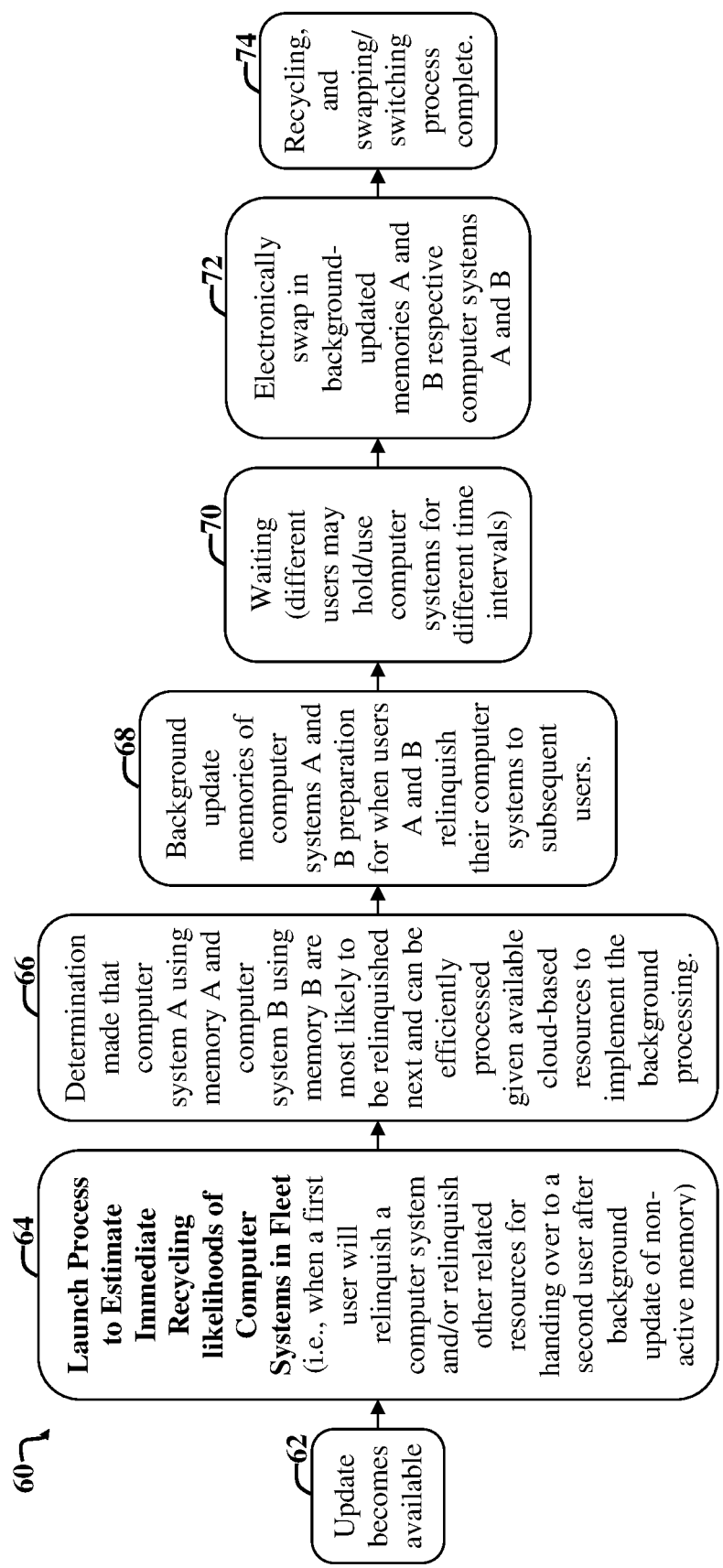
FIG. 2 illustrates an example flow diagram illustrating a first example method that may be employed to selectively prioritize the recycling and associated background updating of plural computing devices (i.e., computer systems) used by one or more users of FIG. 1, e.g., in accordance with estimates of when a particular computer system is most likely to be recycled next.

FIG. 2 illustrates an example flow diagram illustrating a first example method 60 that may be employed to selectively prioritize the recycling and associated background updating of plural computing devices (also called computer systems) used by one or more users of FIG. 1 (via the client systems 12 of FIG. 1), e.g., in accordance with estimates of when a particular computer system (e.g., of the computer systems 20 of FIG. 1) is most likely to be recycled next.

With reference to FIGS. 1 and 2, in a first step 62, an update for computer systems of the fleet becomes available.

In a second step 64, the recycling prioritization system 40 of FIG. 1 launches a process to estimate immediate recycling likelihoods (i.e., estimates as to when or how soon the computer systems may require recycling, and/or estimates as to how immediate a recycling event may be for each computer system).

Subsequently, in a third step 66, the recycling prioritization system 40 of FIG. 1 makes, for example, an estimation (or determination in some use cases) that a computer system A using memory (also called memory device herein) A; and that a computer system B using memory B are most likely to be relinquished next. The recycling prioritization system 40 of FIG. 1 may also determine that sufficient server system resources exist to efficiently background update computer systems A and B, and accompanying memories A and B, respectively.

In a fourth step 68, the recycling prioritization system 40 of FIG. 1 may initiate background updating processes for the computer systems and memories A and B. The initiation of the background updating may be effectuated via one or more control signals sent from the recycling prioritization system 40 of FIG. 1 to the ROT processor 26 of the restoration backend 22.

In the present example use case scenario, a fifth step 70 (which occurs after successful completion of background updating of the computer systems and memories A and B) is a waiting step, understanding that users of the computer systems A and B may not immediately relinquish their computer systems.

Upon relinquishing of their system, a sixth step 72 involves electronically swapping in background updated memories A and B into respective computer systems A and B, such that the previously offline memories A and B become online. This swapping can be effectuated via control signals issued from the ROT processor 26 to the switch 28.

Subsequently, in a seventh step 74, the recycling and memory swapping for computer systems and memories A and B is complete.

Note that the first example method 60 and associated use case scenario may be varied and modified. For instance, the method 60 can be repeated for computers that remain in the fleet, but have not yet been prepared by background processing of alternate offline memories.

Furthermore, while the first example method 60 discusses the updating of two computer systems (A and B) simultaneously, that embodiments are not limited thereto. The numbers of computer systems that are background updated at any given time can be implementation specific and computing environment specific, and can vary based on available computing environment resources, e.g., bandwidth, processing loads, etc. (that can be used for background updating processes).

Figure 3:
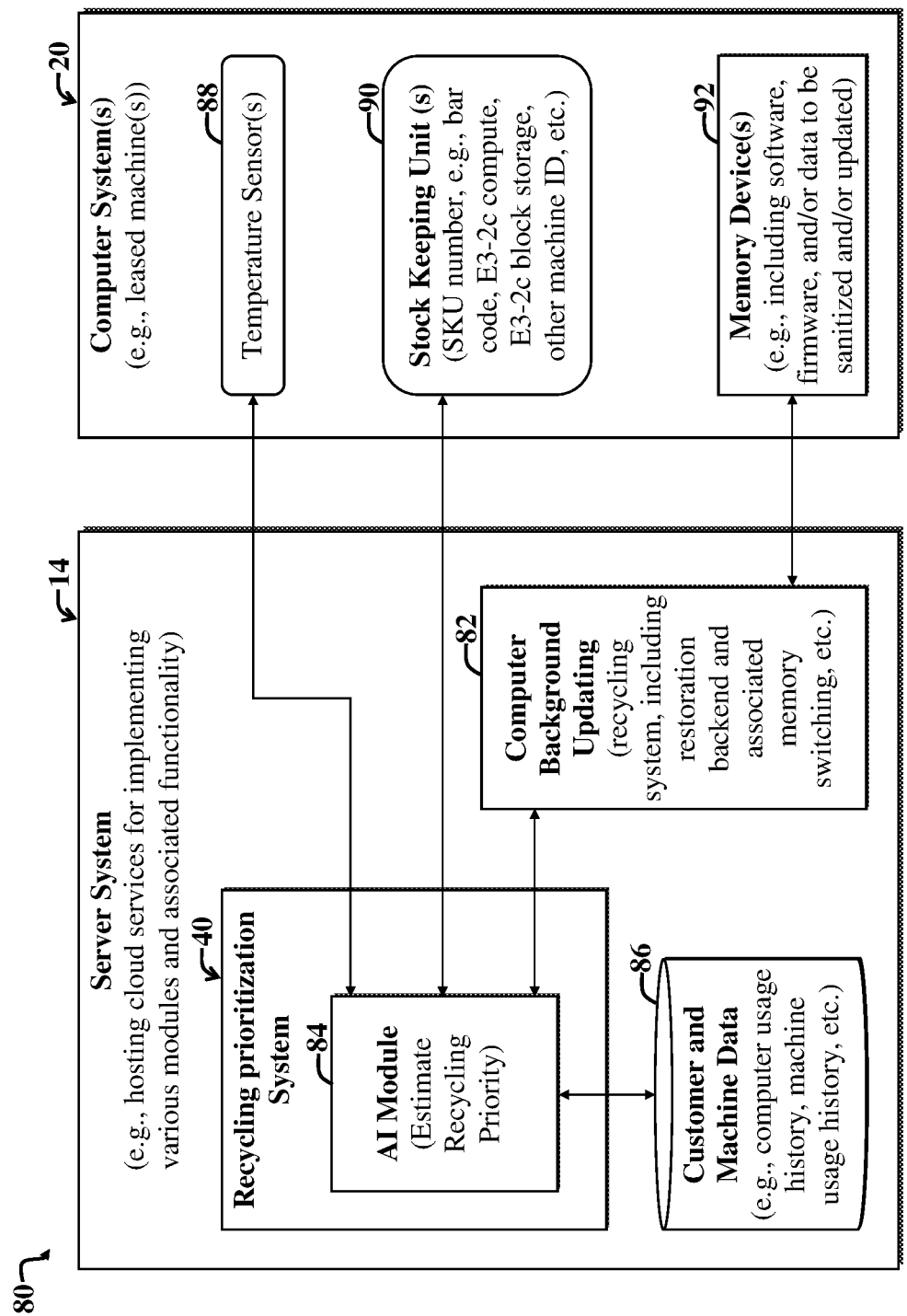
FIG. 3 illustrates a second example system, which may be implemented via the system of FIG. 1, illustrating use of machine learning and associated artificial intelligence for using computer system data to determine an estimate, i.e., prioritization value, indicating how likely the computer system is next to be relinquished by a prior customer and require recycling, e.g., background updating.

FIG. 3 illustrates a second example system 80, which may be implemented via the system 10 of FIG. 1, illustrating use of machine learning and associated artificial intelligence (e.g., via an Artificial Intelligence (AI) module 40) for using computer system data (e.g., data stored in a customer and machine database 86 and/or available directly via the polling of sensors 88, 90 on the computer systems 20) to determine an estimate, i.e., prioritization value, indicating how likely the computer system of the system(s) 20 is next to be relinquished by a prior customer and require recycling, e.g., background updating.

In the second example system 80, the server system 14 is shown including the AI module 84 within the recycling prioritization system 40. For illustrative purposes, the AI module 84 is shown receiving inputs (e.g., in response to polling and/or request messages) from temperature sensor(s) 88, and SKU senders 90. Note that the SKU may alternatively be retrieved from (or pushed by) a customer and machine database 86.

The customer and machine database 86, may also provide metrics as to associations of computer system SKUs with turnover rate; metrics as to associations of individual customers with turnover rates (e.g., how frequently the associated computer systems are relinquished and may need to be recycled), and so on.

The AI module 84 can be trained (e.g., via supervised and/or unsupervised learning methods) on the input data from the various modules 88, 90, 86, so as to incrementally refine the ability of the AI module 84 to accurately estimate when a given computer system is likely to be recycled, e.g., to estimate a likelihood that a given computer system will immediately require recycling, or will otherwise require recycling sooner than another computer system of the fleet.

For illustrative purposes, the AI module 84 provides output to a computer background updating module 82, which includes additional code for selectively initiating background updating and associated processing (e.g., recycling operations) for a set of one or more computer systems estimated by the AI module 84 to likely require background updating before other computer systems.

The background updating module 82 may include one or more additional cloud services, in addition to the restoration backend 22 of FIG. 1, so as to effectuate background processing of computer systems and accompanying memory devices 92 in accordance with priority estimates (also called prioritization estimates or values) output by the AI module 84. Note that the memory devices 92 may include non-volatile memory devices that accommodate firmware, but, embodiments are not limited for use with non-volatile memories and firmware.

Figure 4:
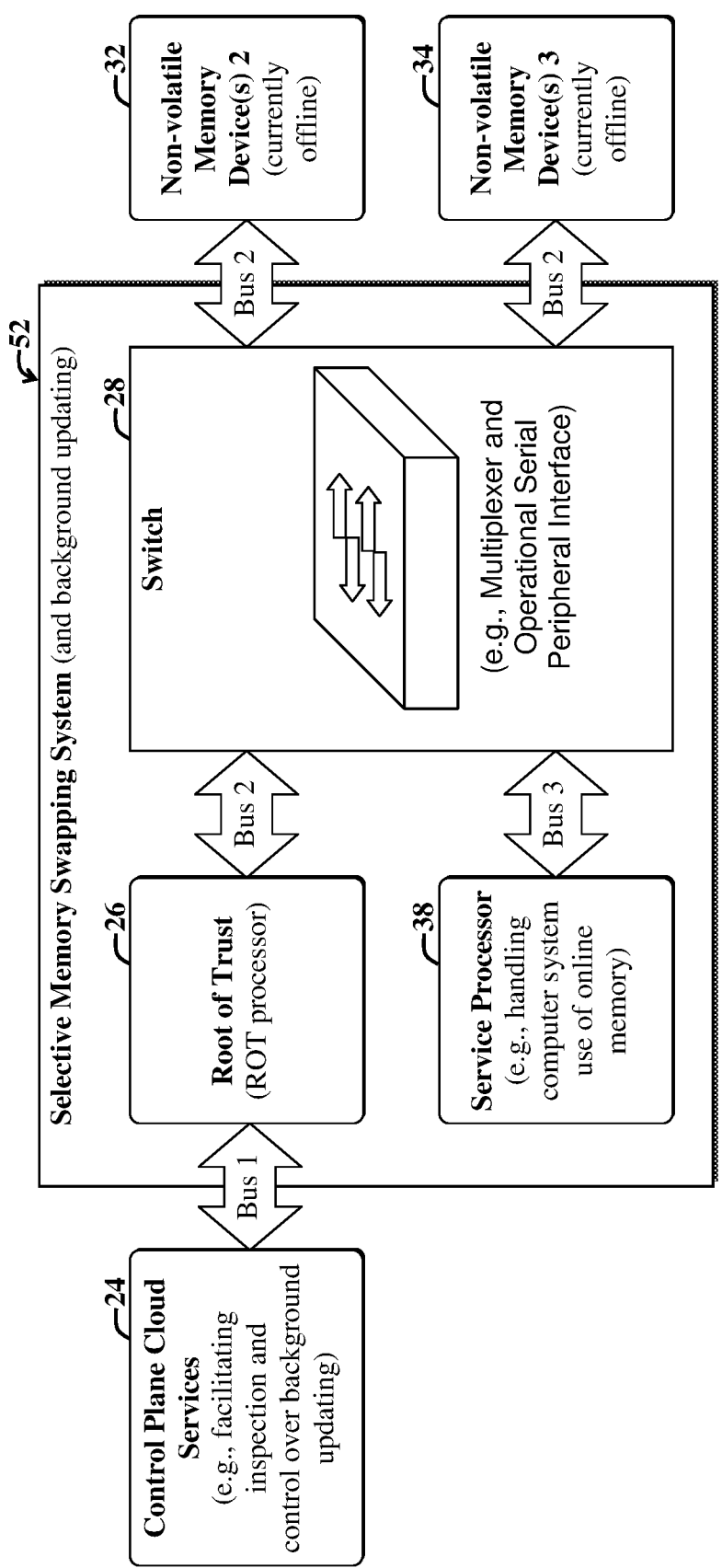
FIG. 4 illustrates example components of a memory swapping system that may be employed to facilitate background updating, e.g., as implemented by a computer background updating module of FIG. 3.

FIG. 4 illustrates example components 26, 28, 38 of a memory swapping system 52 that may be employed to facilitate background updating, e.g., as implemented by the computer background updating module 82 of FIG. 3. In the present example embodiment, the selective memory swapping system 52 is shown including the ROT processor 26, the service processor 38 (of the front-end processing module 18 of FIG. 1), and the switch 28 of the restoration backend 22 of FIG. 1. Note that while the first online memory device 30 of FIG. 1 is not shown in FIG. 4, the selective memory swapping system 52 also communicates with the first memory device 30 of FIG. 1.

In FIG. 4, the control plane cloud services 24 are shown communicating with the ROT 26 of the selective memory swapping system 52 via a first bus (Bus 1). The ROT 26 communicates with the switch 28 via a second bus (Bus 2), the service processor 38 communicates with the switch 28 via a third bus (Bus 3). The switch 28 communicates with the second offline non-volatile memory 32 via a fourth bus (Bus 4). The switch further communicates with the third non-volatile memory device 34 via a fifth us (Bus 5).

Note that the switch 28 may be implemented via various technologies. Those skilled in the art with access to the present teachings may readily determine the appropriate switch architecture to meet the needs of a given implementation, without undue experimentation. In one implementation, the switch 28 can be implemented using a MUltipleXer (MUX) in communication with an Operational Serial Peripheral Interface (OSPI).

Figure 5:
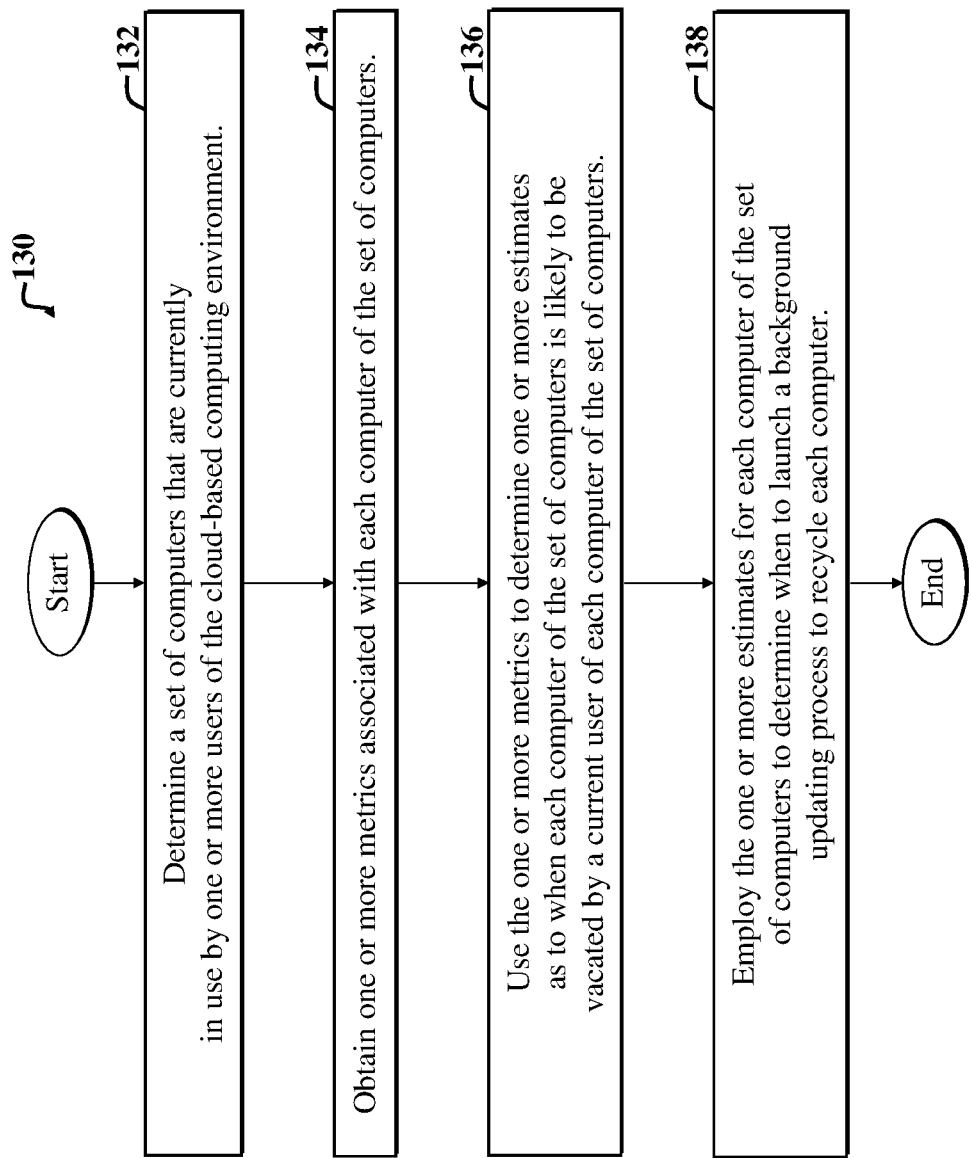
FIG. 5 is a flow diagram of a second example method suitable for use with the embodiments of FIGS. 1-4.

FIG. 5 is a flow diagram of a second example method 130 suitable for use with the embodiments of FIGS. 1-4. The second example method 130 facilitates efficient use of network-accessible computing resources used to recycle or update other computing resources in a cloud-based computing environment (e.g., corresponding to the cloud or server system 14 of FIG. 1).

An initial determining step 132 includes determining a set of computers (e.g., from among the computer systems 20 of FIG. 1) that are currently in use by one or more users of the cloud-based computing environment.

A subsequent obtaining step 134 includes obtaining one or more metrics (e.g., corresponding to inputs to the recycling prioritization system 40 and accompanying AI module 84, as shown in FIG. 3) associated with each computer of the set of computers.

Next, a using step 136 includes using (e.g., via the AI module 84 of FIG. 3) the one or more metrics to determine one or more estimates (e.g., as output by the AI module 84 of FIG. 3) as to when each computer of the set of computers is likely to be vacated by a current user of each computer of the set of computers.

Finally, an employing step 138 includes employing the one or more estimates for each computer of the set of computers to determine when to launch a background updating process to recycle each computer. The employing step 138 may be implemented by code and associated functionality provided by the background updating module 82 of FIG. 3 and associated memory swapping system 52 of FIG. 4.

Note that the second example method 130 may be modified, without departing from the scope of the present teachings. For instance, the second example method 130 may further specify that the employing step 138 further includes using the one or more estimates to prioritize: recycling each computer, such that computers of the set of computers that are estimated, in accordance with the one or more estimates, to be recycled sooner, are prioritized for the background updating process.

The recycling may further include employing the background updating process to update firmware on one or more memory devices of each computer being recycled. The one or more memory devices may include one or more alternate memory devices (e.g., the offline memory devices 32-36 of FIG. 1) configured, by the background updating process, to be switched to replace the one more memory devices of each computer that is to be vacated by the current user.

The recycling may further include employing the background updating process to update firmware, software, and/or data on one or more memory devices of each computer being recycled. The one or more memory devices may be non-volatile memory devices.

The example method 130 may further specify that the one or more metrics include one or more of the following:

a first metric indicating how long each computer has been in use, whereby computers in use longer indicate a higher likelihood of being vacated sooner by the user;

a second metric indicating a historical duration for which the user has retained use of one or more computers, whereby computers used by users that frequently vacate computers indicate a higher likelihood of being vacated sooner by the user;

a third metric indicating a turnover rate for each computer in accordance with an identification number of each computer, whereby computers identified as being associated with high turnover rates indicate a higher likelihood of being vacated sooner by the user;

a fourth metric measuring a temperature associated with each computer, whereby computers associated with lower temperatures indicate a higher likelihood of being vacated sooner; and a fifth metric representing an output value of a machine learning model that accounts for one or more of the first metric, second metric, third metric, and fourth metric, of a machine learning model.

The obtaining step 134 may further include using a cloud service running one or more web services to implement probing the one or more computer systems and one or more data bases to obtain the one or more metrics.

An ROT processor (e.g., the ROT processor 26 of FIG. 4) in communication with a cloud service (e.g., corresponding to the recycling prioritization system 40 of FIGS. 1 and 3, and the control plane cloud services module 24 of FIG. 4), including a Root Of Trust (ROT) processor in communication with the cloud service to facilitate selectively launching one or more processes (e.g., via the computer background updating module 82 of FIG. 3) to implement the background updating process for one or more memory devices (e.g., the memory devices 92 of FIG. 3) in communication with the ROT processor.

Figure 6:
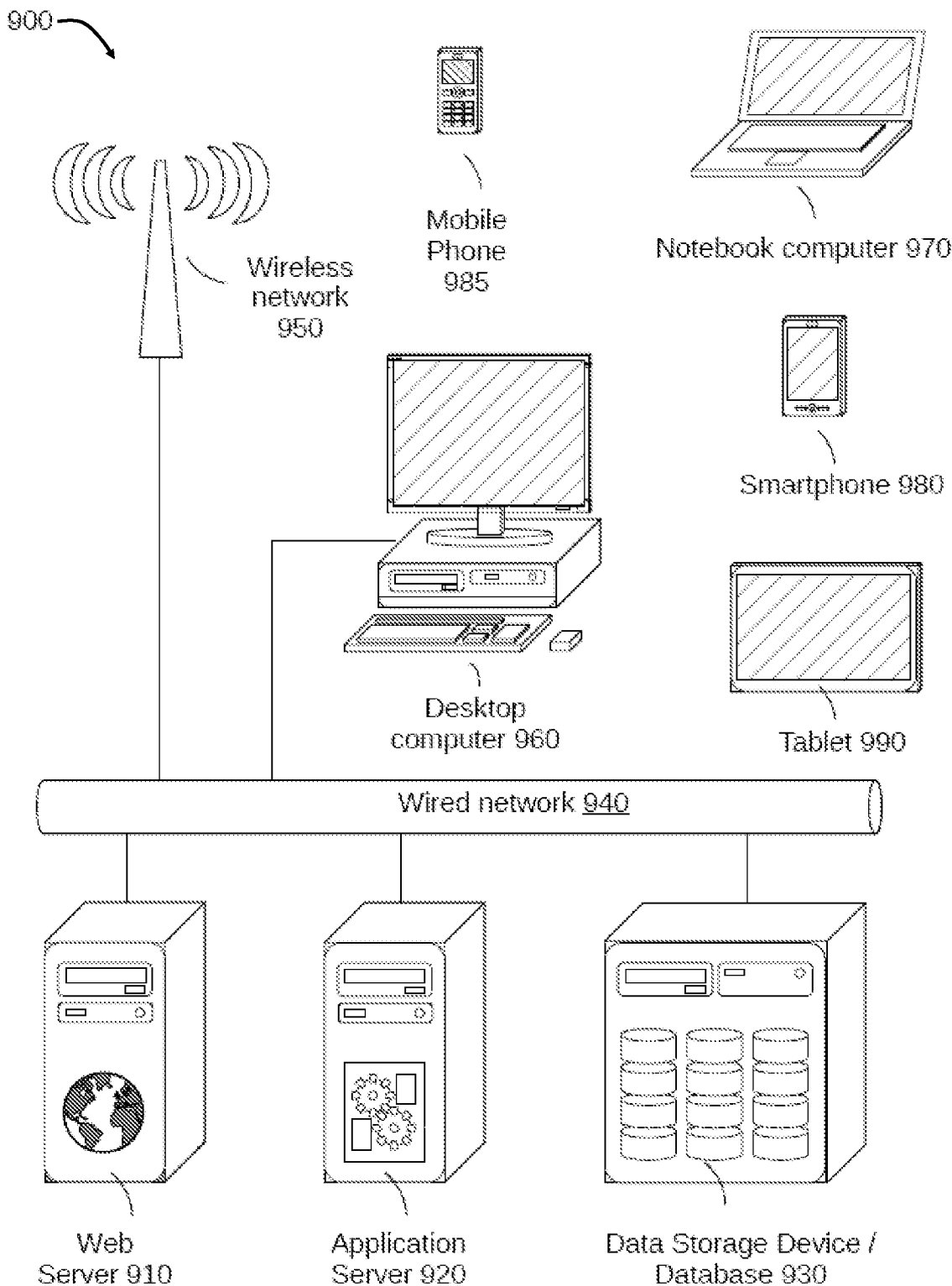
FIG. 6 illustrates a block diagram of an example network environment, which may be used for implementations described herein.

FIG. 6 is a general block diagram of a system 900 and accompanying computing environment usable to implement the embodiments of FIGS. 1-5. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computing devices 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 6, the client system(s) 12 of FIG. 1 may be implemented via one or more of the desktop computer 960, tablet 990, smartphone 980, notebook computer 970, and/or mobile phone 985 of FIG. 6. The server system 14 of FIG. 1 and accompanying modules 18-28 may be implemented via the web server 910 and/or application server 920 of FIG. 6. The customer and machine database 86 of FIG. 3 may be implemented using the data storage device 930 of FIG. 6.

Figure 7:
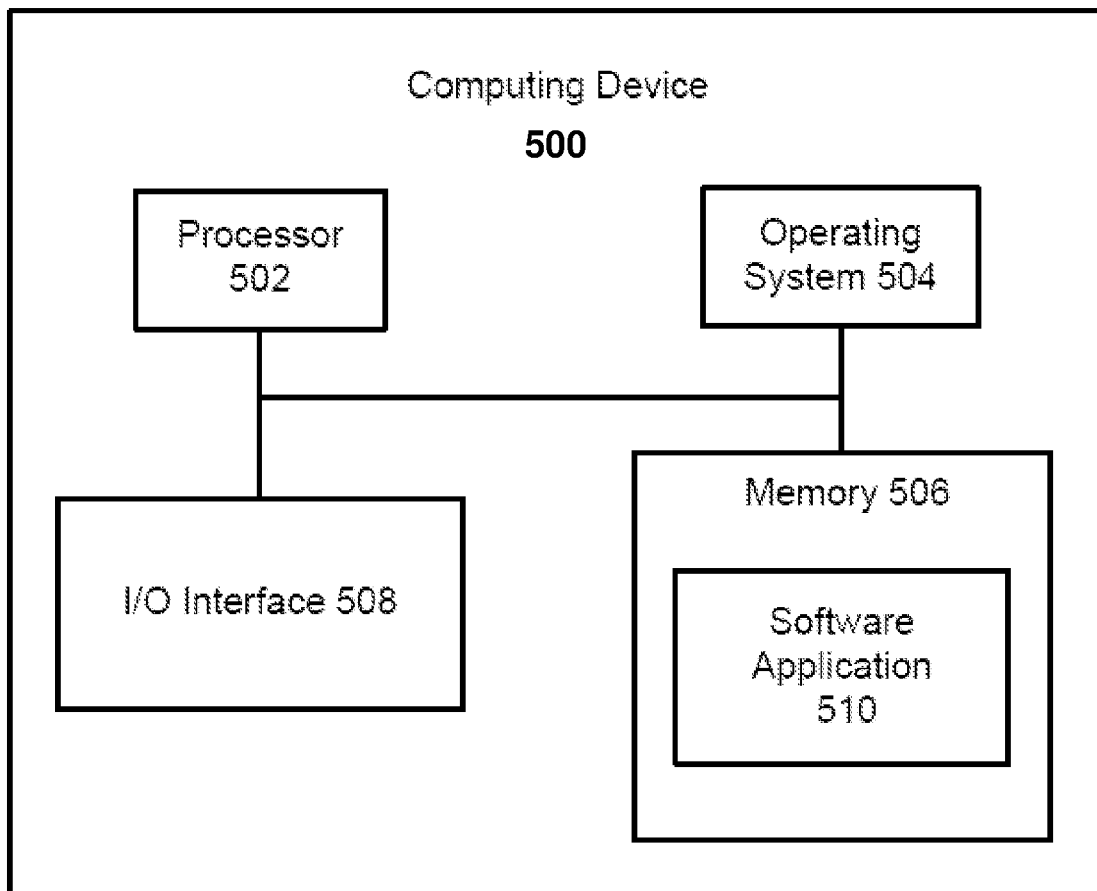
FIG. 7 illustrates a block diagram of an example computing device or system, which may be used for implementations described herein.

FIG. 7 illustrates a block diagram of an example computing device or system 500, which may be used for implementations described herein. For example, the computing device 1000 may be used to implement server devices 910, 920 of FIG. 6 as well as to perform the method implementations described herein. In some implementations, the computing device 1000 may include a processor 1002, an operating system 1004, a memory 1006, and an input/output (I/O) interface 1008.

In various implementations, the processor 1002 may be used to implement various functions and features described herein, as well as to perform the method implementations described herein. While the processor 1002 is described as performing implementations described herein, any suitable component or combination of components of the computing device 1000 or any suitable processor or processors associated with the device 1000 or any suitable system may perform the steps described. Implementations described herein may be carried out on a user device, on a server, or a combination of both.

The example computing device 1000 also includes a software application 1010, which may be stored on memory 1006 or on any other suitable storage location or computer-readable medium. The software application 1010 provides instructions that enable the processor 1002 to perform the functions described herein and other functions. The components of computing device 1000 may be implemented by one or more processors or any combination of hardware devices, as well as any combination of hardware, software, firmware, etc.

For ease of illustration, FIG. 7 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, the computing device 1000 may not have all of the components shown and/or may have other elements including other types of components instead of, or in addition to, those shown herein.

Although the description has been described with respect to particular embodiments thereof, these particular embodiments are merely illustrative, and not restrictive. For instance, although features may be described with respect to specific types of resources or operations, e.g., non-volatile memory, the features described herein may be applicable to other cloud computing resources and operations.

Furthermore, while cloud computing is one example of a computing system described, where the memory restoration system may be implemented by a motherboard, the present memory restoration system may be employed in other computing environments in which a memory device or other electronic hardware is updated in the background. For example, network cards, hard drives, etc. may be updated without interfering with currently executing software.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory, tangible processor-readable medium including instructions executable by one or more processors, and when executed operable for:
    obtaining one or more metrics associated with computers of a set of computers, each computer employing respective currently used memory devices that are currently being used by respective users of a cloud-based computing environment;
    using the one or more metrics to identify a ranking of an order in which at least two or more computers of the set of computers are likely to be vacated by the respective users;
    allocating resources to prepare replacement memory devices to swap with the currently used memory devices according to the ranking; and
    swapping the currently used memory devices with prepared replacement memory devices as a computer device of the set of computers are relinquished.

2. The non-transitory, tangible processor-readable medium of claim 1, wherein preparing the replacement memory includes launching of a background updating process.

3. The non-transitory, tangible processor-readable medium of claim 2, wherein preparing the replacement memory device devices includes employing the background updating process to conduct forensic analysis on one or more memory devices.

4. The non-transitory, tangible processor-readable medium of claim 2, wherein a Root Of Trust (ROT) processor is in communication with a cloud service to facilitate selectively launching the background updating process for the replacement memory devices in communication with the ROT processor.

5. The non-transitory, tangible processor-readable medium of claim 1, wherein the one or more metrics are based on one or more of: current usage time of the respective computers, history of usage times of users of respective computers, or a load metrics indicating a level of activity of the respective computers.

6. The non-transitory, tangible processor-readable medium of claim 5, wherein the metrics include turnover data associated with respective computer stock keeping unit (SKU) identifier.

7. The non-transitory, tangible processor-readable medium of claim 1, wherein the instructions are further operable to determine that sufficient server system resources exist to efficiently background update the replacement memory devices according to the ranking.

8. A method for facilitating efficient use of network-accessible computing resources used to recycle or update other computing resources in a cloud-based computing environment, the method comprising:
    obtaining one or more metrics associated with computers of a set of computers, each computer employing respective currently used memory devices that are currently being used by respective users of a cloud-based computing environment;
    using the one or more metrics to identify a ranking of an order in which at least two or more computers of the set of computers are likely to be vacated by the respective users;
    allocating resources to prepare replacement memory devices to swap with the currently used memory devices according to the ranking; and
    swapping the currently used memory devices with prepared replacement memory devices as a computer device of the set of computer are relinquished.

9. The method of claim 8, wherein preparing the replacement memory devices includes launching of a background updating process.

10. The method of claim 9, wherein preparing the replacement memory devices includes employing the background updating process to conduct forensic analysis on one or more memory devices.

11. The method of claim 9, wherein a Root Of Trust (ROT) processor is in communication with a cloud service to facilitate selectively launching the background updating process for the replacement memory devices in communication with the ROT processor.

12. The method of claim 8, wherein the one or more metrics are based on one or more of: current usage time of the respective computers, history of usage times of users of respective computers, or a load metrics indicating a level of activity of the respective computers.

13. The method of claim 12, wherein the metrics include turnover data associated with respective computer stock keeping unit (SKU) identifier.

14. The method of claim 8, wherein the instructions are further operable to determine that sufficient server system resources exist to efficiently background update the replacement memory devices according to the ranking.

15. An apparatus comprising:
one or more processors; and
logic encoded in one or more tangible media for execution by the one or more processors and when executed operable for:
obtaining one or more metrics associated with computers of a set of computers, each computer employing respective currently used memory devices that are currently being used by respective users of a cloud-based computing environment;
using the one or more metrics to identify a ranking of an order in which at least two or more computers of the set of computers are likely to be vacated by the respective users;
allocating resources to prepare replacement memory devices to swap with the currently used memory devices according to the ranking; and
swapping the currently used memory devices with prepared replacement memory devices as a computer device of the set of computer are relinquished.

16. The apparatus of claim 15, wherein preparing the replacement memory devices includes launching of a background updating process and wherein preparing the replacement memory devices includes employing the background updating process to conduct forensic analysis on one or more memory devices.

17. The apparatus of claim 16, further comprising a Root Of Trust (ROT) processor is in communication with a cloud service to facilitate selectively launching one or more processes to implement the background updating process for the replacement memory devices in communication with the ROT processor.

18. The apparatus of claim 15, wherein the one or more metrics are based on one or more of: current usage time of the respective computers, history of usage times of users of respective computers, or a load metrics indicating a level of activity of the respective computers.

19. The apparatus of claim 18, wherein the metrics include turnover data associated with respective computer stock keeping unit (SKU) identifier.

20. The apparatus of claim 15, wherein the instructions are further operable to determine that sufficient server system resources exist to efficiently background update the replacement memory devices according to the ranking.

* * * * *

UNITED STATES PATENT AND TRADEMARK OFFICE
CERTIFICATE OF CORRECTION

Page 1 of 2

PATENT NO. : 11,755,310 B2
APPLICATION NO. : 17/875229
DATED : September 12, 2023
INVENTOR(S) : Vrooman et al.

It is certified that error appears in the above-identified patent and that said Letters Patent is hereby corrected as shown below:

On the Title Page

Column 2, under Item (57) Abstract, Line 7, delete "sanitized ,and/or" and insert -- sanitized, and/or --, therefor.

In the Drawings

On sheet 3 of 7, in FIG. 3, under Reference Numeral 90, Line 1, delete "Unit (s)" and insert -- Unit(s) --, therefor.

In the Specification

In Column 1, Line 7, delete "a." and insert -- a --, therefor.

In Column 1, Line 8, delete "171074,356," and insert -- 17/074,356, --, therefor.

In Column 1, Line 11, delete "h" and insert -- by --, therefor.

In Column 1, Line 14, delete "applications." and insert -- applications, --, therefor.

In Column 1, Line 15, delete "No," and insert -- No. --, therefor.

In Column 1, Line 16, delete "NON-VOLATILE." and insert -- NON-VOLATILE --, therefor.

In Column 1, Line 21, delete "(OR..ACP0250/" and insert -- (ORACP0250/ --, therefor.

In Column 1, Line 25, delete "n" and insert -- in --, therefor.

In Column 3, Line 46, delete "and or" and insert -- and/or --, therefor.

Signed and Sealed this
Second Day of July, 2024

Katherine Kelly Vidal
*Director of the United States Patent and Trademark Office*

CERTIFICATE OF CORRECTION (continued)
U.S. Pat. No. 11,755,310 B2

In Column 6, Line 28, delete "(BIOS s)," and insert -- (BIOSs), --, therefor.

In Column 11, Line 2, delete "fifth us" and insert -- fifth bus --, therefor.

In the Claims

In Column 16, Line 6, in Claim 2, delete "memory" and insert -- memory devices --, therefor.

In Column 16, Line 10, in Claim 3, delete "device devices" and insert -- devices --, therefor.